United States Patent

[11] 3,627,759

[72] Inventors Jean-Claude Rene Georges Blondel
Savigny-sur-Orge;
Jeans Clement Louis Fouche, Bourg-La-Reine, both of France
[21] Appl. No. 777,862
[22] Filed Nov. 21, 1968
[45] Patented Dec. 14, 1971
[73] Assignee Rhone-Poulenc S. A.
Paris, France
[32] Priority Nov. 24, 1967
[33] France
[31] 129,636

[54] PHENTHIAZINE DERIVATIVES
8 Claims, No Drawings
[52] U.S. Cl..................................................... 260/243,
424/247
[51] Int. Cl....................................................... C07d 93/14
[50] Field of Search........................................... 260/243
A1, 243

[56] References Cited
UNITED STATES PATENTS
3,282,934  11/1966  Sherlock..................... 260/243

Primary Examiner—John D. Randolph
Assistant Examiner—Harry I. Moratz
Attorney—Stevens, Davis, Miller & Mosher ABSTRACT: Phenthiazine derivatives of the formula:

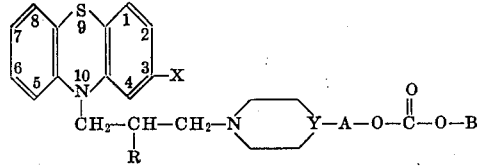

wherein X represents hydrogen, halogen, or alkyl, alkoxy, alkythio, alkanoyl, dialkysulphamoyl or alkanesulphonyl containing one through four carbon atoms, or cyano or trifluoromethyl, R represents hydrogen or methyl, Y represents a tertiary carbon atom or a nitrogen atom, A represents an alkylene group containing one through four carbon atoms or a radical $—A_1—O—A_2—$ in which $A_1$ and $A_2$ represent alkylene group having at least one carbon atom, the total number of carbon atoms in the groups $A_1$ and $A_2$ not exceeding four carbon atoms, and B represents alkyl containing at least five carbon atoms, are very active as long-acting neuroleptics, anti-emetics and tranquilizers.

PHENTHIAZINE DERIVATIVES

This invention relates to new therapeutically useful phenthiazine derivatives and acid addition salts thereof, to a process for their preparation and pharmaceutical compositions containing them.

According to the present invention, there are provided the new phenthiazine derivatives of the general formula:

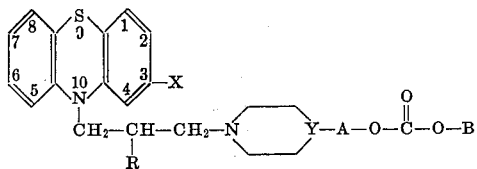

I wherein X represents a hydrogen or halogen atom, or an alkyl, alkoxy, alkylthio, alkanoyl, dialkylsulphamoyl or alkanesulphonyl group containing one to four carbon atoms, or a cyano or trifluoromethyl group, R represents a hydrogen atom or a methyl group, Y represents a tertiary carbon atom or a nitrogen atom, A represents a straight- or branched-chain alkylene group containing one to four carbon atoms or a radical $-A_1-O-A_2-$ in which $A_1$ and $A_2$ represent alkylene groups having at least one carbon atom, the total number of carbon atoms in the groups $A_1$ and $A_2$ not exceeding four carbon atoms, and B represents an alkyl group containing at least five, and preferably not more than 18, carbon atoms, and acid addition salts thereof.

According to a feature of the present invention, the phenthiazine derivatives of formula I are prepared by the reaction of an alcohol of the general formula:

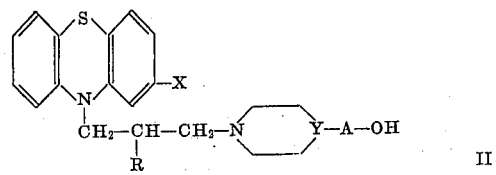

II (wherein A, R, X and Y are as hereinbefore defined) with a compound of the general formula:

III wherein B is as hereinbefore defined and X represents a halogen atom, preferably chlorine or bromine. It is advantageous to carry out the reaction in an anhydrous inert organic solvent such as an aromatic hydrocarbon (for example benzene, toluene or xylene) or a chlorinated hydrocarbon (for example chloroform) at the boiling temperature of the solvent employed and in the absence or presence of an inorganic or organic acid-binding agent.

The phenthiazine derivatives of formula I obtained according to the foregoing process may be purified to physical methods such as crystallization or chromatography, or by chemical methods such as the formation of salts, crystallization of the salts and decomposition of them in an alkaline medium. In the said chemical method, the nature of the anion of the salt is immaterial, the only requirement being that the salt must be well-defined and readily crystallizable.

The phenthiazine derivatives of formula I may be converted in manner known per se into acid addition salts. The acid addition salts may be obtained by the action of acids on the phenthiazine derivatives in appropriate solvents. As organic solvents there may be used, for example, alcohols, ethers, ketones or chlorinated hydrocarbons. The salt which is formed is precipitated, if necessary after concentration of its solution, and is separated by filtration or decantation.

The phenthiazine derivatives of the present invention and their acid addition salts have interesting pharmacodynamic properties; they are very active as long-acting neuroleptics, antiemetics and tranquillizers. They have given good results as such in physiological experiments with animals (dogs) at doses of 0.005 to 1.0 mg./kg. of animal body weight by subcutaneous administration. For example, the phenthiazine derivatives of formula I have been found to have a prolonged antagonistic effect against emesis caused by apomorphine in the dog. A single subcutaneous dosage to dogs of one of the new compounds of 0.13 to 0.32 mg./kg. reduces the number of vomits caused by the subcutaneous administration of 0.91 mg./kg. of apomorphine by 50 percent for from 7 to 14 days. Compounds of particular importance are those of formula I in which R represents a hydrogen atom, and more especially those in which A represents an ethylene group, for example 3-trifluoromethyl-10-3-[4-(-heptyloxycarbonyloxyethyl)-1-piperazinyl]propyl phenthiazine, 3-dimethylsulphamoyl-10-3-[4-(2Heptyloxycarbonyloxyethyl)piperdino]propyl phenthiazine, 3-methylthio-10-3-[4-(2-heptyloxycarbonyloxyethyl)-1-piperazinyl]propyl phenthiazine, 3-trifluoromethyl-10-3-[4-(2-decyloxycarbonyloxyethyl)-1-piperazinyl]propyl phenthiazine and their acid addition salts.

The following examples illustrate the invention.

EXAMPLE 1

A mixture of 3-trifluoromethyl-10-{3-[4-(2-hydroxyethyl)-1-piperazinyl]propyl }phenthiazine (2.45 g.), heptyl chloroformate (1.26 g.), pure triethylamine (0.76 g.) and anhydrous chloroform (100 cc.) is heated under reflux for 14 hours. After cooling, the reaction mixture is stirred with a 10 percent aqueous solution of sodium bicarbonate (20 cc.). The organic solution is decanted and washed three times with water (total 100 cc.) until it is neutral, dried over anhydrous sodium sulfate and evaporated under reduced pressure (20 mm. Hg). The residue (3.25 g.), dissolved in ethanol (30 cc.) under reflux, is treated with maleic acid (1.37 g.) in solution in ethanol (13 cc.). After cooling for 17 hours at 3° C., the crystals which have formed are filtered off, washed twice with ice-cold ethanol (total 6 cc.) and dried under reduced pressure (20 mm. Hg) to yield 3-trifluoromethyl-10-{3-[4-(2-heptyloxycarbonyloxyethyl)-1-piperazinyl]propyl}phenthiazine maleate (3.7 g.), m.p. about 172° C.

Heptyl chloroformate (b.p. 82° C./18 mm. Hg.) is prepared in accordance with the method of H. Najer et coll., Bull. Soc. Chim. Fr., p.52 (1955).

3-trifluoromethyl-10-{3-[4-(2-hydroxyethyl)-1-piperaazinyl]-propyl}phenthiazine employed as starting material is prepared in accordance with the method of H.L. Yale et coll., J. Amer. Chem. Soc., 82, 2039 (1960).

EXAMPLE 2

A mixture of 3-dimethylsulphamoyl-10-{3-[4-(2-hydroxyethyl)-piperidino]propyl}phenthiazine (10.0 g.), heptyl chloroformate (7.5 g.), distilled triethylamine (4.25 g.) and anhydrous xylene (350 cc.) is heated under reflux for 16 hours. After cooling, the reaction mixture is stirred with distilled water (200 cc.). The organic solution is decanted and washed five times with distilled water (total 250 cc.), dried over anhydrous sodium sulfate and evaporated at 100° C. under reduced pressure (15 mm. Hg). The residue (12.6 g.) is chromatographed on neutral alumina (250 g.) and eluted with a mixture (3,500 cc.) of ethyl acetate and benzene (30:70 volume.)

The eluates are evaporated under reduced pressure (15 mm. Hg). The residue (2.9 g.), dissolved in acetone (20 cc.) under reflux, is treated with anhydrous oxalic acid (0.45 g.) in solution in acetone (5 cc.). After cooling for 20 hours at 3° the crystals which have formed are filtered off, washed twice with ice-cold acetone (total 5 cc.) and dried under reduced pressure (15 mm. Hg) to give 3-dimethylsulphamoyl-10-{3-[4-(2-heptyloxycarbonyloxyethyl)piperidino]propyl}-phenthiazine oxalate (2.53 g.) m.p. about 145° C.

3-Dimethylsulphamoyl-10-{3-[4-(2hydroxyethyl)piperidino]-propyl}phenthiazine (m.p. 123° C.) employed as starting material is prepared by the procedure described in the specification of British Pat. No. 904,208 granted to Rhone-Poulenc S. A. on an application filed Oct. 16th, 1959 by reacting 4-(2-hydroxyethyl)piperidine with 3-dimethylsulphamoyl-10-(3-methanesulphonyloxypropyl)phenthiazine.

EXAMPLE 3

A mixture of 3-methylthio-10-{3-[4-(2-hydroxyethyl)-1-piperazinyl]propyl}phenthiazine (7.8 g.), heptyl chloroformate (3.57 g.), triethylamine (2.02 g.) and anhydrous toluene (200 cc.) is heated under reflux for 2 hours. After cooling, the reaction mixture is washed twice with distilled water (total 150 cc.) and then with an aqueous normal solution of sodium bicarbonate (50 cc.), and finally twice with distilled water (total 50 cc.). The organic solution, after drying over anhydrous sulfate, is evaporated. The oily residue obtained is dissolved in ethanol (20 cc.) and treated with a boiling solution of fumaric acid (4.40 g.) in ethanol (60 cc.). After cooling, the crystals which have formed are filtered off, washed with ice-cold ethanol (25 cc.) and then with diethyl ether (25 cc.), and finally dried under reduced pressure (20 mm. Hg.) to yield 3-methylthio-10-{3-[4-(2-heptyloxycarbonyloxyethyl)-1-piperazinyl]propyl} phenthiazine fumarate (12.7 g.), m.p. about 180° C.

3-Methylthio-10-{3-[4-(2-hydroxyethyl)-1-piperazinyl]propyl}-phenthiazine employed as starting material is prepared as described in the specification of British Pat. No. 824,536 granted to Societe des Usines Chimiques Rhone-Poulenc on an application filed Jan. 24, 1958 by reacting 1(2-hydroxyethyl)piperazine with 3-methylthio-10-(3-toluene-p-sulphonyloxypropyl)phenthiazine.

EXAMPLE 4

A mixture of 3-trifluoromethyl-10-{3-[4-(2-hydroxethyl)-1-piperazinyl]propyl}phenthiazine (3.6 g.), decyl chloroformate (2.65 g.), triethylamine (1.2 g.) and anhydrous toluene (100 cc.) is heated under reflux for 5 hours. The reaction mixture is then treated in the same manner as described in example 3 to yield 3-trifluoromethyl-10-{3-[2-decyloxycarbonyloxyethyl)-1-piperazinyl]propyl}phenthiazine fumarate (6.85 g.), m.p. about 180° C.

Decyl chloroformate (b.p. 121° C./10mm. Hg.) is prepared by the action of phosgene solution on decyl alcohol in toluene.

EXAMPLE 5

A mixture of 3-trifluoromethyl-10-{3-[4-(2-hydroxyethyl-1-piperazinyl]propyl}phenthiazine (3.5 g.), hexadecyl chloroformate (3.66 g.), triethylamine (1.21 g.) and anhydrous toluene (100 cc.) is heated under reflux for 6 hours. The reaction mixture is then treated in the same manner as described in example 3 to yield 3-trifluoromethyl-10-{3-[4-(2-hexadecyloxycarbonyloxyethyl)-1-piperazinyl]propyl} phenthiazine fumarate (5.0 g.), m.p. about 184° C.

Hexadecyl chloroformate (b.p. 148° c./0.05 mm. Hg) is prepared by the action of a phosgene solution on hexadecyl alcohol in toluene.

The present invention includes within its scope pharmaceutical compositions which comprise, as active ingredient, at least one of the phenthiazine derivatives of formula I in association with a pharmaceutically acceptable carrier. The invention includes especially such preparations made up for parenteral, in particular subcutaneous or intramuscular, administration.

Preparations for parenteral administration include sterile nonaqueous solutions. Examples of suitable nonaqueous solvents are injectable vegetable oils, such as sesame or olive oil, and injectable organic esters such as ethyl oleate. The preparations may be sterilized by, for example, filtration through a bacteria-retaining filter, by incorporation in the compositions of sterilizing agents, by irradiation, or by heating.

The percentage of active ingredient in the compositions of the invention may be varied, it being necessary that it should constitute a proportion such that a suitable dosage shall be obtained. The dosage depends on the desired therapeutic effect and on the duration of treatment. In human therapy the compositions should generally be administered so as to give to an adult between 5 mg. and 100 mg. of active substance at the rate of one intramuscular injection every 2 to 4 weeks.

Because of the prolonged antiemetic effect of the new phenthiazine derivatives mentioned above, it is often desirable to administer the compounds by subcutaneous injection as depot preparations. Such preparations may be made by conventional method, e.g., by dissolving the new bases of formula I in an injectable water-insoluble vegetable oil, e.g., in a concentration of 1 percent by weight, and, if necessary, subsequently sterilizing the solution obtained by filtration through a bacteriological filter.

The following examples illustrate pharmaceutical compositions according to the invention.

EXAMPLE 6

3-Trifluoromethyl-10-{3-[4-(2-heptyloxycarbonyloxyethyl)-1-piperazinyl]propyl}phenthiazine maleate (120 mg.) is treated at ambient temperature with a mixture of a 1 percent aqueous solution of sodium bicarbonate (110 cc.) and diethyl ether (100 cc.). After dissolution, the ethereal phase is decanted, washed three times with distilled water (total 60 cc.) until it is neutral, and then dried over anhydrous magnesium sulfate. After concentration under reduced pressure (20 mm. Hg.), the residue (75 mg.) is dissolved in sterile sesame oil (7.5 cc.) at 40° C. After cooling to ambient temperature, the clear yellow solution is passed through a millipore filter to give a sterile 1 percent solution of 3trifluoromethyl-10-{3-[4-(2-heptyloxycarbonyloxyethyl)-1-piperazinyl[propyl}-phenthiazine, which is thereafter placed in 2 cc. ampuls ready for medicinal use.

EXAMPLE 7

3-Dimethylsulphamoyl-10-{3-[4-(2-heptyloxycarbonyloxyethyl)-piperidino]propyl phenthiazine oxalate (150 mg.) is treated at ambient temperature with a mixture of a 1 percent aqueous solution of sodium bicarbonate (100 cc.) and diethyl ether (50 cc.). After dissolution, the ethereal phase is decanted, washed three times with distilled water (total 60 cc.) until it is neutral, and then dried over anhydrous magnesium sulfate. After concentration under reduced pressure (20 mm. Hg,) the residue (120 mg.) is dissolved in sterile sesame oil (12 cc.) at 40° C. After cooling to ambient temperature, the clear yellow solution is passed through a millipore filter to yield a sterile 1 percent solution of 3-dimethylsulphamoyl-10-{3-[4-(2-heptyloxycarbonyloxyethyl)piperidino]propyl -phenthiazine, which is thereafter placed in 2 cc. ampuls ready for medicinal use.

We claim:
1. a phenthiazine of the formula:

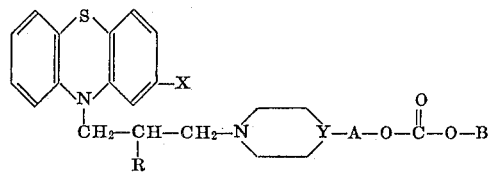

wherein X represents hydrogen, halogen, or alkyl, alkoxy, alkylthio, alkanoyl, dialkylsulphamoyl or alkanesulphonyl containing one through four carbon atoms, or cyano or trifluoromethyl, R represents hydrogen or methyl, Y represents a tertiary carbon atom or a nitrogen atom, A represents an alkylene group containing one through four carbon atoms or a radical —$A_1$—O—$A_2$— in which $A_1$ and $A_2$ represent alkylene groups each having at least one carbon atom, the total number of carbon atoms in $A_1$ and $A_2$ not exceeding four carbon atoms, and B represents alkyl of five through 18 carbon atoms, and acid addition salts thereof.

2. A phenthiazine according to claim 1 wherein R represents a hydrogen atom.

3. A phenthiazine according to claim 1 wherein A represents the ethylene group.

4. The phenthiazine derivative according to claim 1 which is 3trifluoromethyl-10d-{3-[4-(2-heptyloxycarbonyloxyethyl)-1-piperazinyl]propyl}phenthiazine.

5. The phenthiazine derivatives according to claim 1 which is 3-dimethylsulphamoyl-10-{3-[4-(2-heptyloxycarbonyloxyethyl)-piperidino]propyl}phenthiazine.

6. The phenthiazine derivative according to claim 1 which is 3-methylthio-10-{3-[4-(2-heptyloxycarbonyloxyethyl)-1-piperazinyl]-propyl}phenthiazine.

7. The phenthiazine derivative according to claim 1 which is 3-trifluoromethyl-10-{3-[4-(2-decyloxycarbonyloxyethyl)-1-piperazinyl]propyl}phenthiazine.

8. The phenthiazine derivative according to claim 1 which is 3-trifluoromethyl10-{3-[4-(2-hexadecyloxycarbonyloxyethyl)-1-piperazinyl]propyl}phenthiazine.

* * * * *